United States Patent [19]
Shaffer et al.

[11] Patent Number: 6,094,681
[45] Date of Patent: Jul. 25, 2000

[54] APPARATUS AND METHOD FOR AUTOMATED EVENT NOTIFICATION

[75] Inventors: Shmuel Shaffer, Palo Alto; William Joseph Beyda, Cupertino, both of Calif.

[73] Assignee: Siemens Information and Communication Networks, Inc., Boca Raton, Fla.

[21] Appl. No.: 09/053,212

[22] Filed: Mar. 31, 1998

[51] Int. Cl.[7] .................................................. G06F 15/173
[52] U.S. Cl. ........................... 709/224; 709/206; 709/207
[58] Field of Search .................................... 709/224, 207, 709/206, 227, 223; 710/17, 18; 714/39, 47, 51; 379/93.24

[56] References Cited

U.S. PATENT DOCUMENTS

| | | | |
|---|---|---|---|
| 4,554,418 | 11/1985 | Toy .............................................. | 179/2 |
| 5,327,684 | 8/1993 | Record et al. ........................... | 395/650 |
| 5,530,868 | 6/1996 | Record et al. ........................... | 395/700 |
| 5,657,372 | 8/1997 | Ahlberg et al. .......................... | 455/414 |
| 5,721,825 | 2/1998 | Lawson et al. ..................... | 395/200.33 |

FOREIGN PATENT DOCUMENTS 2 213 889  3/1998  Canada .

OTHER PUBLICATIONS

"A Value–Added Service with Brains" by R. Gareiss; vol. 24, No. 1, Jan. 1, 1995, pp. 66,68, 70.

"Portable Speech–Activated, Electronic Mail System"; IBM Technical Disclosure Bulletin, vol. 38, No. 7, Jul. 1, 1995, pp. 537–538.

*Primary Examiner*—Mehmet B. Geckil

[57] ABSTRACT

A method and system for automatically providing remote notification of a locally detected event includes receiving data and analyzing the content of the data using a data filter of a computer. The data filter is configured to detect an indication of a predetermined event within the data. If the event is detected, the data filter activates a local event indicator associated with the computer. An event indicator monitor determines whether a user response is initiated within a configurable time interval after activation of the event indicator. If the monitor determines that no user response is initiated within the configurable time interval, the monitor transmits an establish-connection message to a control program. The control program responds to the establish-connection message by accessing an event notification message from a database which indicates access numbers of the remote communication devices to which to transmit the event notification message. Communication links are established to the remote communication devices and the event notification message is transmitted to the devices. The data filter is capable of analyzing data included in web page updates transmitted to a web browser of the computer, e-mail messages, scheduling updates and requests transmitted to an electronic calendar of the computer, and scheduling reminders transmitted by the electronic calendar.

11 Claims, 3 Drawing Sheets

APPARATUS AND METHOD FOR AUTOMATED EVENT NOTIFICATION

BACKGROUND OF THE INVENTION

The invention relates generally to a system and method for event notification over a telecommunications network and, more particularly, the invention relates to automatic notification of a locally detected remote event over a telecommunications network.

DESCRIPTION OF THE RELATED ART

Computing devices, such as work stations and personal computers, have come to occupy a more central role as communication devices with the increasing interconnectivity provided by networks such as the Internet and local area networks (LANs). E-mail enables users to transmit and receive text messages and to attach data files within these messages. Push technology associated with the World Wide Web of the Internet enables a user to subscribe to a service which automatically transmits to the user updates of particular web sites. For instance, a user might subscribe to a push service which provides regular updates of stock prices. Each time the stock prices are updated at a particular web site, or after a selected period of time, the user receives updated information.

A personal computer is also often used to support an electronic calendar. A user is able to enter meetings and appointments into computer memory, and the calendar software automatically provides reminders of upcoming scheduled events. A computer can also be equipped for voice-over-data network telephony, such as internet protocol (IP) telephony. Moreover, the IP-telephony enabled computer can be equipped with a messaging function, so that the computer allows a caller to leave a voice message if the user is unavailable to take a call.

Each of these communication technologies can be configured to alert a user that information has been received or that an attempt has been made to establish a communication link. When an e-mail message is received, the computer can be configured to beep to indicate receipt of the message. Alternatively, a visual indicator such as a flashing icon, can be made to appear on a screen of the computer to indicate that a message has been received. In the electronic calendar example, the electronic calendar can be configured to provide a local reminder of an upcoming event by activating an audio signal and displaying a visual reminder on the computer screen. However, if the user is away from the computer when the event occurs, the user will not receive notification of the event. This is especially troublesome if the event is urgent, for instance, a rescheduling message for a critical meeting.

U.S. Pat. No. 5,721,825 to Lawson et al. describes a system and method for global event notification in a distributed computer environment. A local event registry identifies local event consumers who should be notified when an event occurs. A global event registry identifies which remote servers should be notified of the event, so that event consumers supported by the remote servers can also be notified of the event. When the event occurs, a local server accesses both the local event registry to determine which local event consumers to notify and the global event registry to determine which remote servers require notification. Although the Lawson et al. invention is effective for its intended purpose of providing global event notification, the invention does not solve the problem of remote event notification of a user who is determined to be locally unavailable to receive notification.

What is needed is a system and method for remote user notification of an event when the user is determined to be unavailable to locally receive notification.

SUMMARY OF THE INVENTION

A method and system for providing automatic event notification to a locally unavailable user of a telecommunications system include providing computers with a data filter for analyzing content of received data (i.e., messages) to determine if the data includes an indication of occurrence of a predetermined event. The data filter communicates with an event indicator associated with the computer to provide a visual alert upon detection of the predetermined event by the data filter. An event indicator monitor is connected to the event indicator to determine whether the user is locally available to receive an event notification. If a specified action is not taken by the user of the computer within a configurable time interval following an activation of the event indicator, the event indicator monitor generates an establish-connection message that is configured to access a system capability to transmit a notification to a remote communication device.

In one embodiment of the system, a server is connected on a data network to control remote notification capability of the system. The server includes a control program configured to trigger a notification sequence in response to receiving the establish-connection message from the event indicator monitor. The sequence is executed by the control program to establish a telecommunications link to a remotely located communication device. A transmitter associated with the server transmits an event notification to a specified remotely located communication device (e.g., a user-specified telephone or pager) via the telecommunications link. Preferably, the event notification includes an identification of the message content of interest to a notified user.

In a preferred embodiment, the messages received by the computer include web page updates received by a router associated with a web server on the World Wide Web of the Internet. For example, the computer may be subscribed to a push service provider which provides scheduled updates of stock prices. The data filter is configured to search the content of updates and to detect a predetermined event in the web page updates, such as a drop in stock X below a certain price, for example $50 per share. Upon receiving a web page update, the data filter determines whether the update includes data reflecting a drop in stock X below $50 per share. If the data filter detects this event, the data filter activates the event indicator associated with the computer, triggering a local notification alert (e.g., an icon appears on a computer screen). The event indicator monitor determines whether the user of the computer is locally available by monitoring whether a specified responsive action occurs within a configurable time interval after activation of the event indicator (e.g., depressing a specific key of a keyboard). If the indicator is not deactivated within the configurable time interval, the monitor transmits the appropriate establish-connection message to the server.

The server accesses the remote notification capability of the system in response to the establish-connection message. The server or computer includes the telephone number(s) for one or more user-specified remote communication devices. These devices might include a wireless pager, a wireless telephone, a wired telephone, and/or a personal digital assistant (PDA). If the notification protocol requires a communication link to an alpha-numeric pager or a PDA, a text message generator is utilized to construct an event notification text message that includes the identification of the event of interest. If the protocol requires a connection to a telephone or a voice messaging service associated with a pager, a text-to-speech converter converts the text message into a speech format. The server establishes the connections to whichever devices are indicated in the protocol, and the transmitter transmits the message via the communication link. In alternative embodiments, the data received by the computer for content-analysis by the data filter are e-mail messages or electronic calendar scheduling messages.

DETAILED DESCRIPTION

Figure 1:
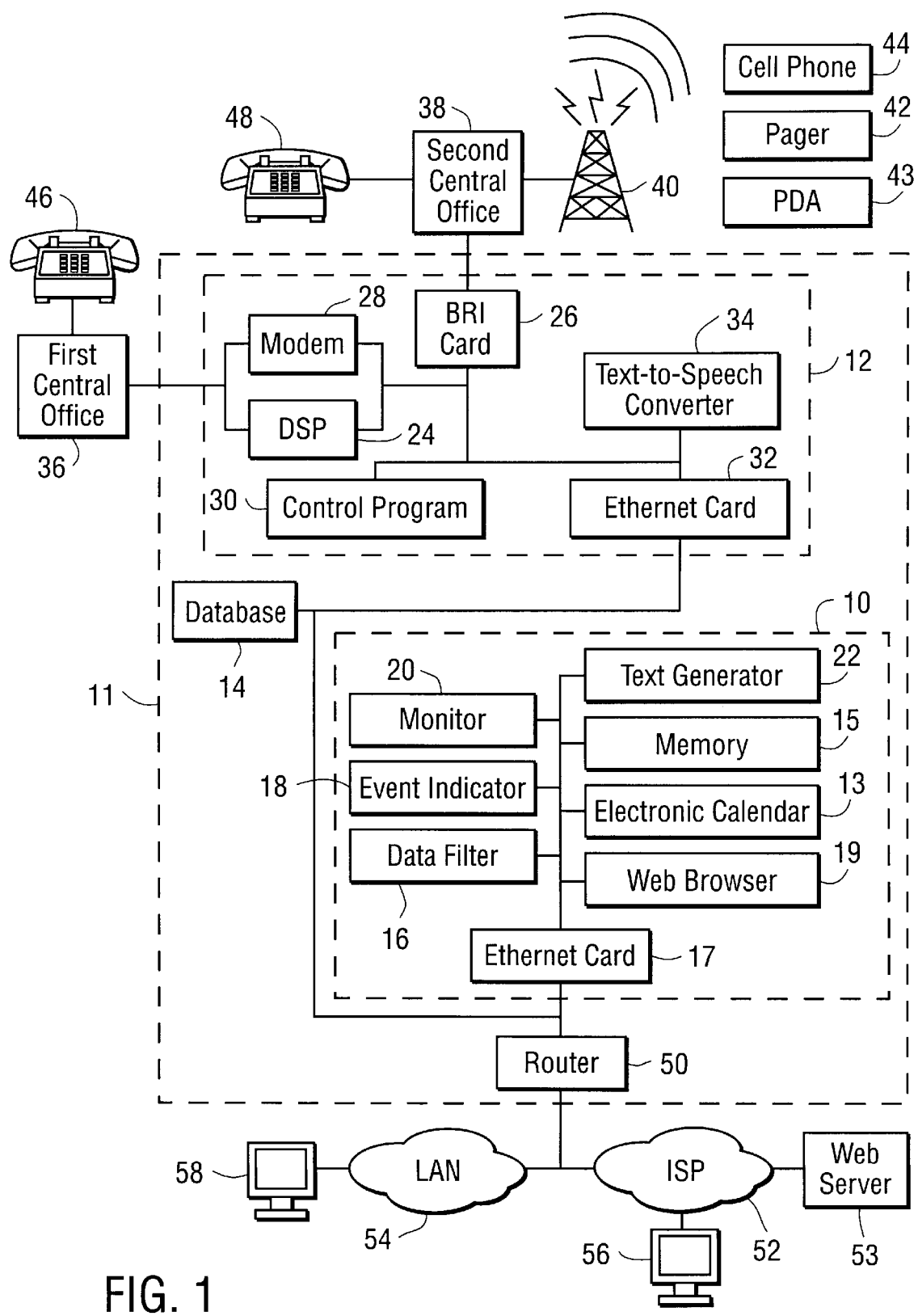
FIG. 1 is a block diagram of a system for providing automatic remote notification of a locally detected event.

With reference to FIG. 1, a system for automatically providing remote notification of a locally detected event includes a computing device 10 such as a first personal computer, or a workstation located on a data network 11 such as a first local area network (LAN). A server 12 is located on the first LAN 11 and is enabled to establish telecommunications links to remotely located communication devices through a first central office 36 and a second central office 38. The first central office 36 supports an analog telephone 46 and the second central office 38 supports an ISDN telephone 48. The second central office 38 is also connected to a wireless base station 40, which provides signaling to a wireless pager 42, a personal digital assistant (PDA) 43, and a wireless cellular phone 44. A database 14, which is accessible to the server 12, stores an event notification protocol. A text-to-speech converter 34 converts specified event notification messages to a speech format. A router 50 is located on the first LAN 11, which enables the computer 10 to communicate with a first remote computer 56 via an Internet Service Provider (ISP) and a second remote computer 58 located on a remote LAN 54 and to access a web server 53 of the World Wide Web via the ISP 52.

The first computer 10 includes a data filter 16 configured to parse through data received via the Internet and the remote LAN 54 to determine whether a predetermined event is included in the received data. For example, the data filter may execute keyword searches for descriptors in the contents of received messages. An event indicator 18 connected to the data filter 16 is responsive to detection of the event by the data filter 16. An event indicator monitor 20 monitors the event indicator to determine whether a user of the first computer 10 is locally available to receive notification of occurrence of the event. An electronic calendar program 13 allows a user of the computer 10 to store and retrieve scheduling information from memory 15. A text generator 22 is used to generate an event notification text message which is stored in memory 15 of the computer. An ethernet card 17 enables the first computer 10 to transmit and receive data.

The server 12 includes a control program 30 configured to access the remote event notification capability of the system and to access information from the database 14. A digital signal processor 24 converts digital signals into a format compatible for processing by an analog communication device. The server 12 further includes a basic rate interface (BRI) card 26 to establish connections over the ISDN and to transmit voice information and data over ISDN connections. A modem 28 enables the server 12 to establish telephonic connections via the first central office 36 and to transmit voice information and data over those connections. Alternatively, an ethernet card 32 is accessed to transmit and receive data over the first LAN 11.

The web server 53 is enabled for providing a push service in which locally supported web sites and/or remotely located web sites are monitored to determine when updates occur. Subscribers to the push service, such as the first computer 10, are automatically provided with updates of preselected web sites upon detection of the updates by the web server 53 or at user-configurable times. For example, the user of the computer 10 might subscribe to a push service provided by the web server 53 which transmits scheduled updates of prices of selected stocks.

The data filter 16 can be configured to parse through content of stock price web updates for specific information, such as the price of stock X falling below $50 per share. If the data filter 16 identifies such data, the data filter 16 activates the event indicator 18 to provide local notification of the occurrence of the event (stock X<$50/share) at the first computer 10. The event indicator 18 can be configured to produce an audio signal, such as a beep, together with an icon displayed on a computer screen (not shown) to indicate that stock X has dropped below the $50 threshold. Alternatively, the screen might simply display the web page update so that, regardless of which application the computer 10 is running, the web page update is displayed on at least a portion of the computer screen. The event indicator 18 is configured to be deactivated upon execution of a predetermined response by the user within a predetermined time interval. For instance, if the user strikes any key on the keyboard within ten seconds of activation, the event indicator 18 is deactivated.

The event indicator monitor 20 monitors the event indicator 18 to determine whether the user deactivates the indicator 18 within the predetermined time interval. If the monitor determines that the indicator 18 has been deactivated, the monitor takes no further action, because it is apparent that the user has received the stock price update information. If the indicator 18 is not deactivated within the predetermined time interval, the monitor 20 accesses an event notification text message from the local memory 15 and causes the text message to be transmitted to the control program 30 of the server 12 together with an establish-connection message. The establish-connection message includes the content of interest (e.g., "stock X<$50/share") and includes an identifier for the first computer 10.

The text message is assembled by the text generator 22. The text generator 22 can assemble the text of the message either at the pre-configured direction of a user or through communication with the data filter 16. In the first instance, the user constructs the message during configuration of the computer 10 for detection of a particular event by using a keyboard (not shown) associated with the computer 10 to enter the message. The text generator 22 responds to the entry made by the user by storing the message in the memory 15 with a message identifier, which is also communicated to the event indicator monitor 20. The monitor 20 associates the identifier with the particular event, for instance stock X price below $50 per share, which the data filter 16 is configured to detect. If the monitor 20 determines that the user is unavailable to locally receive notification of the event, the monitor 20 uses the message identifier to access the appropriate event notification message from local memory 15 for transmission to the control program 30. Alternatively, the text generator 22 can be configured to communicate with the data filter 16 to receive a portion of the web update within which the data filter 16 has detected the event. The text generator 22 constructs an elemental event notification message based on the received portion of the web page update.

The control program 30 accesses the event notification protocol assigned to the first computer 10 from the database 14 using the first computer identifier. The event notification protocol provides instructions to the control program, indicating the remotely located communication devices which are to receive an event notification message. The event protocol might instruct the control program 30 to transmit the message to the pager 42, the PDA 43, the cellular phone 44, and the ISDN phone 48. Other possible communication devices which can receive an event notification message include the analog telephone 46 and the first and second remote computers 56 and 58.

The pager 42, if it is an alpha-numeric pager, the PDA 43, and the first and second remote computers 56 and 58 are enabled to receive and display alpha-numeric messages. However, the analog telephone 46 and the cellular phone 44 are equipped to receive speech messages, not text messages. The control program 30 utilizes the text-to-speech converter 34 to convert the text message to a speech format suitable for transmission to the analog telephone 46 or the cellular phone 44, if the event notification protocol indicates that the event notification message must be transmitted to these devices.

The server 12 utilizes the BRI card 26 to establish a connection via the second central office 38. The analog modem 28 and the DSP 24 are utilized to establish a connection via the first central office 36. If the event notification protocol requires that the notification message be transmitted to either the first or second remote computers 56 and 58 via e-mail, the server utilizes the ethernet card 32 to transmit the e-mail via the router 50.

The first computer 10 can also be configured to analyze e-mail it receives to determine if the content of the e-mail includes an indication of a predetermined event. The user can configure the data filter 16 to process received e-mails to determine if the received e-mail was transmitted from a particular individual. If the user is expecting an urgent e-mail message from a particular individual, for instance an important client, the user configures the data filter 16 to recognize e-mails transmitted from the client's e-mail address. Alternatively, the data filter 16 can be configured to analyze the text of e-mail messages to determine whether the e-mail contains certain keywords associated with a subject of interest. The push technology described above can also utilize e-mail as a method for transmitting the web page updates. The data filter 16 analyzes the e-mail content to determine whether the predetermined event is included in the e-mail in the same manner as if the web update were transmitted to the computer's web browser 19.

The data filter 16 can also analyze messages associated with the electronic calendar 13. The messages can be either scheduling updates or requests received from a remote device, such as the first remote computer 56 or a scheduling reminder generated by the electronic calendar 13 to locally notify the user of an upcoming appointment. In the first case, the scheduling update/request message transmitted from the first remote computer 56 is analyzed by the data filter 16 to determine if it includes the predetermined event in the same manner as the e-mail messages or the web page updates are analyzed. The analysis can focus on the sender identity or the subject matter of the update/request text. In the case of the scheduling reminder message locally generated by the electronic calendar 13, the data filter 16 does not have to perform a detailed analysis of the message. Arrival of the scheduling reminder message is itself the predetermined event. It has already been determined that the user requires the scheduling reminder, so the data filter 16 activates the event indicator 18 automatically upon receipt of the scheduling reminder.

The operation of the event notification system described above is not significantly affected by the format of the data received by the first computer 10. Whether the data is in the format of a web page update directed to the browser 19, an e-mail message, or an electronic calendar message, the data filter 16 determines whether the event has occurred, the event indicator 18 and the monitor 20 cooperate to determine if the user is locally available to receive notification of the event, and the server 12 performs the remote notification if the user is determined to be locally unavailable.

Figure 2:
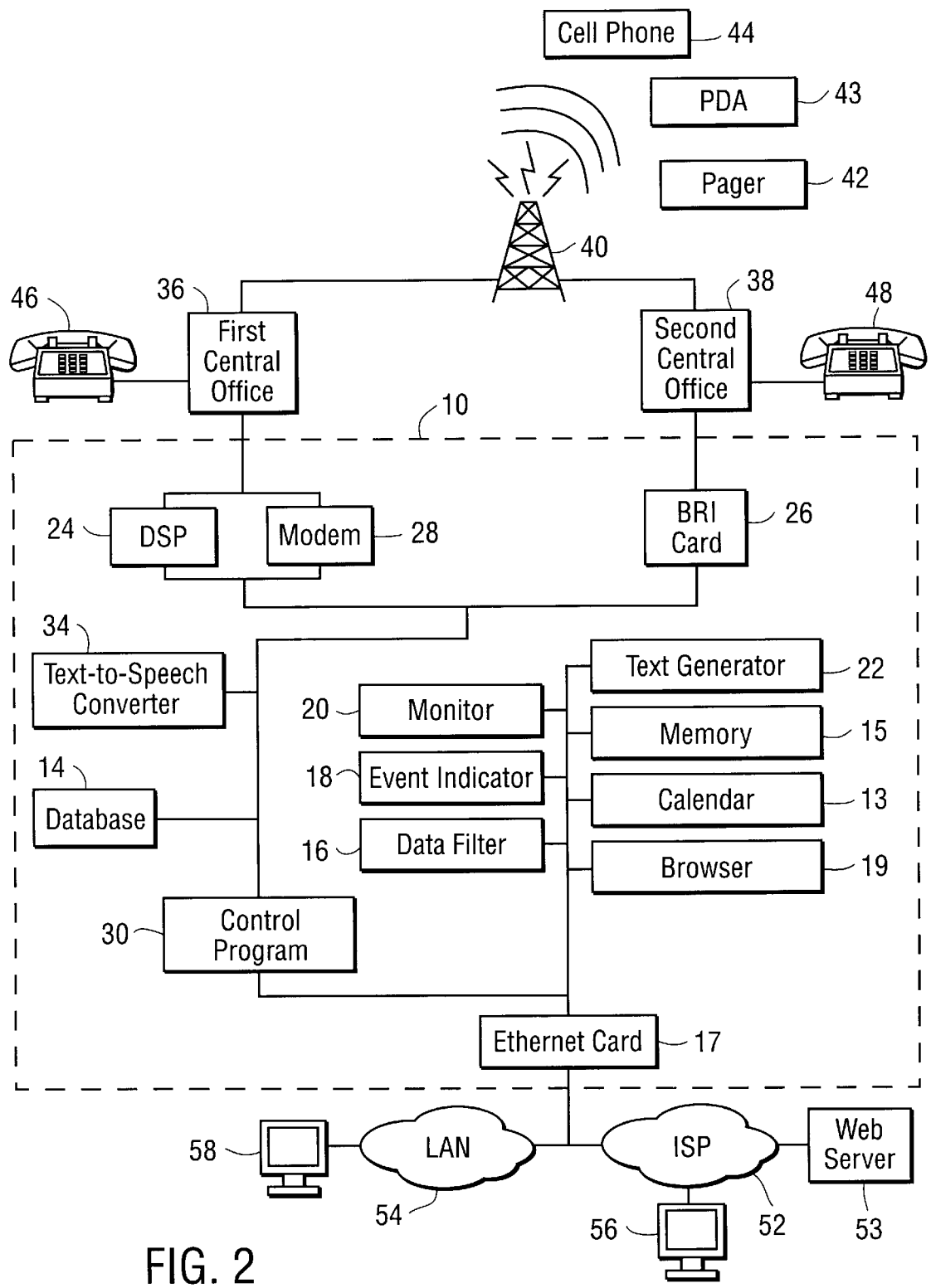
FIG. 2 is a block diagram of an alternative embodiment of the system for providing automatic remote event notification of a locally detected event.

With reference to FIG. 2, an alternative embodiment of the event notification system merges the server function into the first computer 10, so that the computer 10 performs all of the operations of the system. The computer 10 is located on the LAN 54 and is able to communicate with the first and second remote computers 56 and 58 in the same manner as in FIG. 1. In addition to the event detection and local notification functions enabled by the data filter 16, the event indicator 18, and the event indicator monitor 20, the computer 10, the control program 30, database 14, text-to-speech converter 34, DSP 24, modem 28 and the BRI card enable the computer 10 to perform the remote notification as well.

Figure 3:
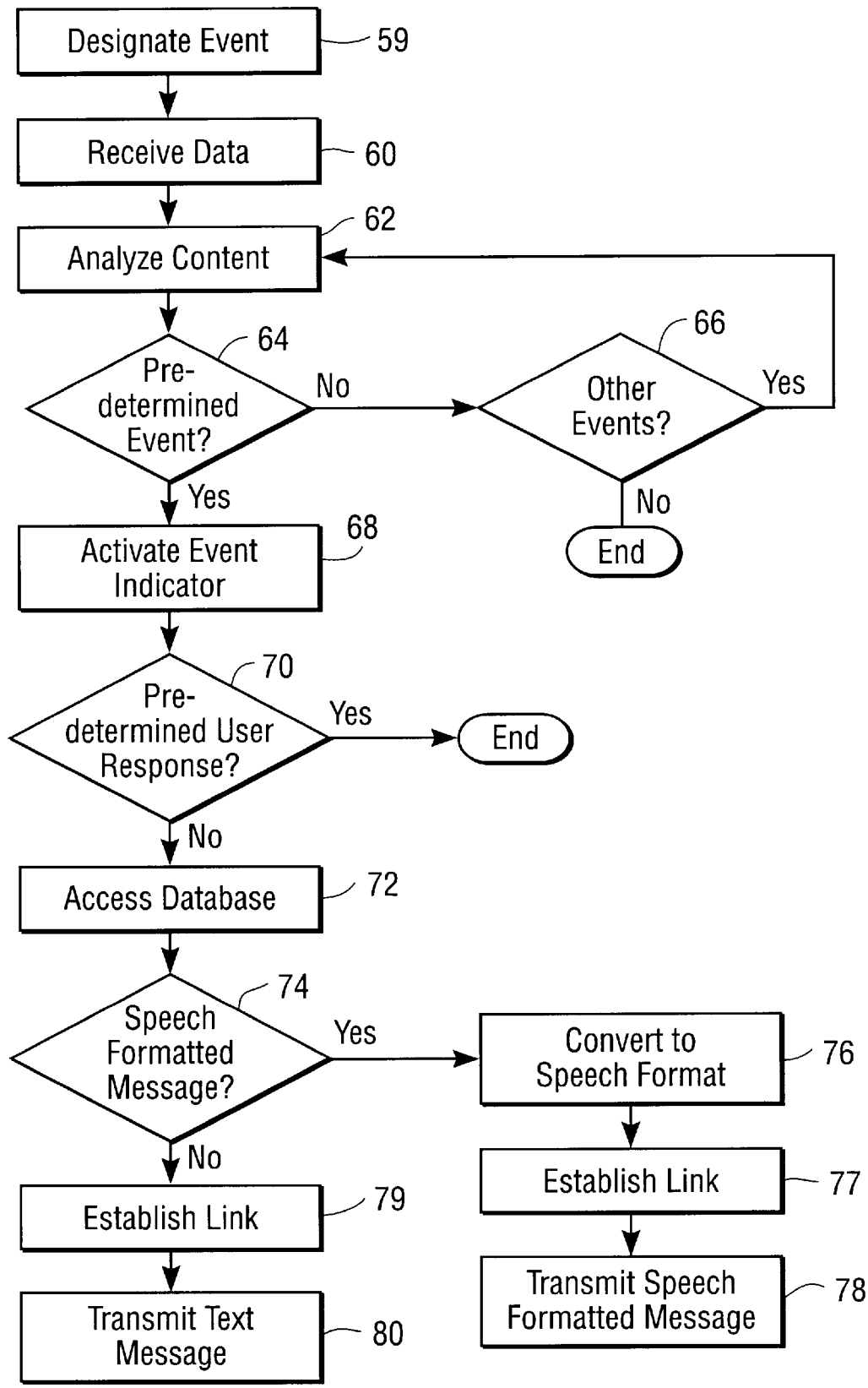
FIG. 3 is a process flow of a method for providing automatic remote notification of a locally detected event utilizing the system shown in FIGS. 1 or 2.

Referring to FIG. 3, a method for automatically providing remote event notification upon determination that the user is locally unavailable to receive notification includes designating at least one event as being of interest in step 59 and receiving a data transmission in step 60. As previously discussed, the transmission can include an e-mail message, a web page update directed to the browser 19 of the computer 10, a scheduling message directed to the electronic calendar 13, or a scheduling reminder message generated by the electronic calendar 13. The data is transmitted to the data filter 16, which has been configured to detect a predetermined event, for instance an e-mail message transmitted from a particular address. In step 62, the data filter 16 analyzes the content of the data to determine in step 64 whether the data includes the event. Continuing with the e-mail example above, the data filter 16 determines whether the transmission is an e-mail message, and if it is an e-mail message, whether it was transmitted from the address in question. Although the data filter 16 has been described as analyzing data for a single event, it should be understood that the data filter 16 can be configured to detect or recognize multiple events. The data filter 16, when configured to perform an analysis of data for multiple events, performs the analysis for each event, one at a time, until the data filter 16 has screened all of the events.

If a first predetermined event is not detected, in step 66 the data filter 16 determines if any other events are of concern. If no events remain, the data filter 16 takes no further steps. If other events remain, the data filter returns to step 62 and analyzes the data to determine if it includes a second event. If a predetermined event is detected, the data filter 16 activates the event indicator 18 in step 68. Activation of the event indicator 18 can include activating an audio alarm and/or displaying a visual icon which indicates the occurrence of an event.

The event indicator monitor 20 monitors the event indicator 18 to determine in step 70 if a user response is registered within a configurable time interval after activation of the event indicator 18. The user response can be a keystroke of the computer keyboard (not shown) within ten seconds of activation of the indicator 18, which disables the indicator 18. If the monitor 20 detects the user response within ten seconds, the monitor 20 takes no further steps because deactivation of the indicator 18 demonstrates that the user is locally available to receive the event notification. If no response is detected within the configurable time interval, the monitor 20 transmits an establish-connection message to the control program 30. The control program 30 accesses the event notification protocol from the database 14 in step 72 to determine to which remote communication devices to transmit an event notification message.

Based on the event notification protocol accessed from the database 14, the control program 30 determines in step 74 whether the message must be converted to a speech-formatted message. If the only remote communication devices to be contacted are enabled for receiving and displaying text messages, then the message does not need to be reformatted. On the other hand, if one of the communication devices is not enabled to display text messages, such as the pager 42, then the control program utilizes the text-to-speech converter 34 to convert the message to a speech format in step 76. In step 77, a communication link to the pager 42 is established. Once the notification message has been converted to a speech format, the server 12 transmits the message to the pager 42 in step 78. If the notification protocol indicates that a speech-formatted message is not necessary, then the server 12 establishes a communication link in step 79 and transmits the text message to the remotely located communication device, such as the remote computer 56 and 58 or the PDA 43 in step 80.

What is claimed is:

1. A method for providing automatic remote notification of a locally detected event comprising the steps of:
   designating at least one event as being of interest to a first user of a data network;
   monitoring specified user-intended messages received via said data network for conveying message information to said first user;
   electronically analyzing content of said specified messages to determine whether said content is indicative of occurrence of one of said designated events;
   determining whether said first user is available to receive an automated event notification at a specified local communication device on said data network if said content of one of said specified user-intended messages is determined to be indicative of occurrence of one of said designated events;
   automatically establishing a telecommunications link to a specified remote user communication device in response to a determination that said first user is unavailable to receive said automated event notification at said specified local communication device; and
   transmitting said automated event notification to said specified remote user communication device via said telecommunications link;
wherein said step of monitoring said specified user-intended messages includes receiving a web page update from a web server on the World Wide Web, said analyzing step including executing a search of data content of said web page update to detect an indication of an occurrence of one of said designated events.

2. A method for providing automatic remote notification of a locally detected event comprising the steps of:
   designating at least one event as being of interest to a first user of a data network;
   monitoring specified user-intended messages received via said data network for conveying message information to said first user;
   electronically analyzing content of said specified messages to determine whether said content is indicative of occurrence of one of said designated events;
   determining whether said first user is available to receive an automated event notification at a specified local communication device on said data network if said content of one of said specified user-intended messages is determined to be indicative of occurrence of one of said designated events;
   automatically establishing a telecommunications link to a specified remote user communication device in response to a determination that said first user is unavailable to receive said automated event notification at said specified local communication device; and
   transmitting said automated event notification to said specified remote user communication device via said telecommunications link;
wherein said step of monitoring said user-intended specified messages includes receiving a scheduling message associated with an electronic calendar, said analyzing step including determining whether content of said scheduling message includes an indication of one of said designated events.

3. A method for providing automatic remote notification of a locally detected event comprising the steps of:
   designating at least one event as being of interest to a first user of a data network;
   monitoring specified user-intended messages received via said data network for conveying message information to said first user;
   electronically analyzing content of said specified messages to determine whether said content is indicative of occurrence of one of said designated events;
   determining whether said first user is available to receive an automated event notification at a specified local communication device on said data network if said content of one of said specified user-intended messages is determined to be indicative of occurrence of one of said designated events;
   automatically establishing a telecommunications link to a specified remote user communication device in response to a determination that said first user is unavailable to receive said automated event notification at said specified local communication device; and
   transmitting said automated event notification to said specified remote user communication device via said telecommunications link;
wherein said analyzing step further includes determining at least one of whether content is indicative of an appointment within a predetermined time interval and whether said content is indicative of an appointment with a predetermined party.

4. A method for providing automatic remote notification of a locally detected event comprising the steps of:
   designating at least one event as being of interest to a first user of a data network;
   monitoring specified user-intended messages received via said data network for conveying message information to said first user;

electronically analyzing content of said specified messages to determine whether said content is indicative of occurrence of one of said designated events;

determining whether said first user is available to receive an automated event notification at a specified local communication device on said data network if said content of one of said specified user-intended messages is determined to be indicative of occurrence of one of said designated events;

automatically establishing a telecommunications link to a specified remote user communication device in response to a determination that said first user is unavailable to receive said automated event notification at said specified local communication device; and transmitting said automated event notification to said specified remote user communication device via said telecommunications link;

wherein said step of analyzing said content includes filtering data for predetermined content representative of an occurrence of said one of said designated events, the method further comprising the steps of creating a notification message indicative of said occurrence of said one of said designated events and converting said notification message to a speech format, said transmitting step including transmitting said speech formatted notification message to one of a telephone and a voice messaging system associated with a pager.

5. A system for automatically providing event notification over a telecommunications network comprising:

means for receive data addressed to a local communication device, said local communication device and said receiving means being connected to a data network;

means, operatively coupled to said receiving means, for filtering said user addressed data for content indicative of an occurrence of a predetermined event;

means, in communicative contact with said filtering means, for determining whether a user is locally accessible at said local communication device to receive an automated event notification of said occurrence of said predetermined event;

means, responsive to said determining means, for automatically establish a telecommunications link to a remotely located communication device in response to a determination of user inaccessibility at said local communication device; and means for transmitting said automated event notification to said remotely located communication device via said telecommunications link wherein said receiving means is selectively connected to a web server of the World Wide Web, said data addressed to said local communication device including a web page update transmitted from a router associated with said web server, said filtering means being enabled to filter said web page update for said content indicative of said occurrence of said predetermined event.

6. A system for automatically providing event notification over a telecommunications network comprising:

means for receive data addressed to a local communication device, said local communication device and said receiving means being connected to a data network;

means, operatively coupled to said receiving means, for filtering said user addressed data for content indicative of an occurrence of a predetermined event;

means, in communicative contact with said filtering means, for determining whether a user is locally accessible at said local communication device to receive an automated event notification of said occurrence of said predetermined event;

means, responsive to said determining means, for automatically establish a telecommunications link to a remotely located communication device in response to a determination of user inaccessibility at said local communication device; and means for transmitting said automated event notification to said remotely located communication device via said telecommunications link wherein said data addressed to said local communication device includes a scheduling message associated with an electronic calendar.

7. The system of claim 5 or 6 wherein said transmitting means is configured to transmit said text message to said remotely located communication device, said remotely located communication device being one of a personal digital assistant (PDA).

8. A system for automated telecommunications messaging within a network having an event-notification capability for supporting transmissions of notifications to communication devices comprising:

a plurality of computing devices, each computing device including:

(a) an input connected to said network to receive user-intended data configured for display of said data in a human-perceivable format;

(b) data filter means for searching content of said data to recognize subject matter indicative of at least one user-configurable condition;

(c) condition-indicator means for triggering a visual alert at said computing device in response to recognition of one of said user-configurable conditions; and (d) an event-indicator monitor configured to generate and transmit an establish-connection message in response to passage of a time-out period following initiation of said visual alert by said condition-indicator means, said establish-connection message being configured to initiate access to said event-notification capability of said network.

9. The system of claim 7 further comprising means, associated with said transmitting means, for converting said text message to a speech message, said transmitting means being configured to transmit said speech message to said remotely located communication device.

10. The system of claim 8 further comprising a server connected to each said computing device, said server having a control program responsive to receiving one of said establish-connection messages from one of said computer devices, said control program triggering a telecommunications link to a specific remote communication device as a response to said establish-connection message.

11. The system of claim 10 further comprising transmission means connected to said server for transmitting a notification message to said specific remote communication device via said telecommunications link.

* * * * *